Oct. 13, 1964  W. BUHL  3,152,831
AUTOMOBILE BACK SEAT HEAD REST
Filed Feb. 21, 1962
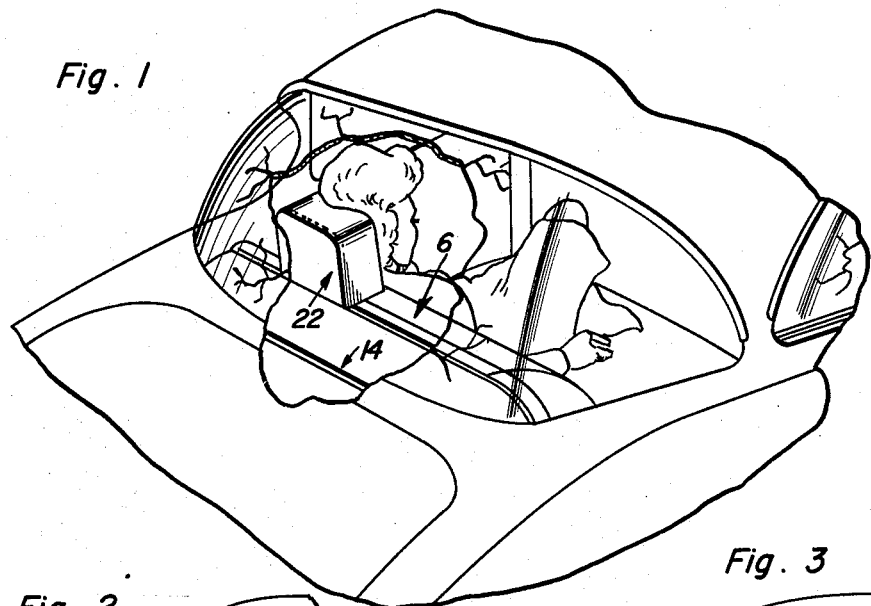
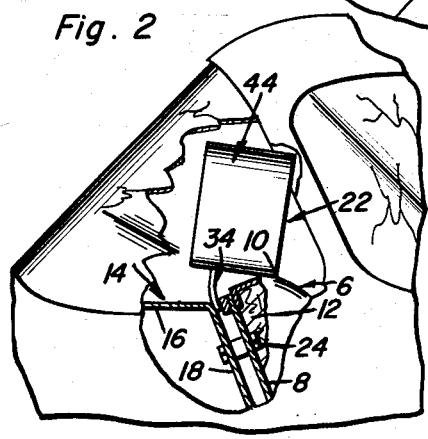
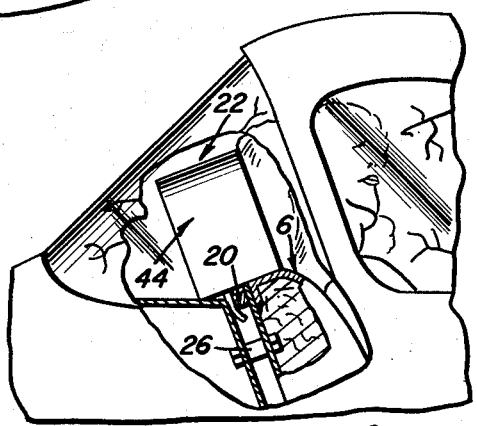
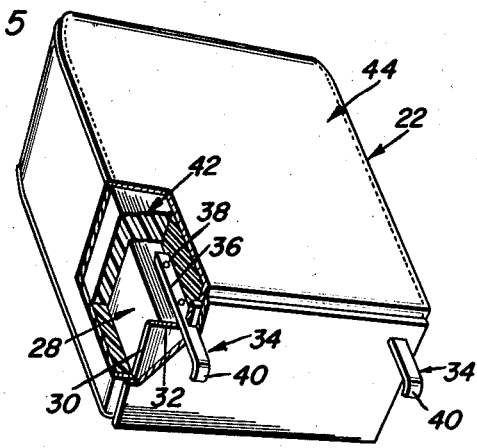
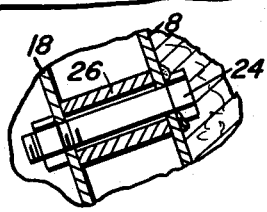
William Buhl
INVENTOR.

United States Patent Office 3,152,831
Patented Oct. 13, 1964

3,152,831
AUTOMOBILE BACK SEAT HEAD REST
William Buhl, Apt. 707, Rogue Valley Manor,
Medford, Oreg.
Filed Feb. 21, 1962, Ser. No. 174,827
5 Claims. (Cl. 296—63)

The present invention relates to an improved headrest which is expressly constructed and appropriately adapted for use atop the backrest of the rear or back seat in an automobile and has reference, more particularly stated, to a headrest which lends itself to reliable and acceptable use in conjunction with the upper portion of the backrest and an adjacent upper cooperating edge portion of the shelf-like deck which is currently in use in passenger-type automobiles.

In carrying out a preferred embodiment of the invention a headrest of novel form has been evolved and produced. It is such that it does not interfere with practical use by a passenger occupying the back seat by reason of the fact that the forward surface of the headrest is approximately one inch or so rearwardly of the normal position of the user's head when sitting naturally. Therefore, if he wishes to use the headrest all that he needs to do is to lean his head back slightly and take advantage of the support surface of the headrest. Also and because of its unique construction used the headrest does not interfere with a clear view of the road with the aid of the usual interior rear view mirror.

In evaluating and assessing this invention the reader should take into consideration the fact that the construction herein shown and described has been experimentally used and has proved out to be compact, convenient, efficient, is capable of remaining firmly and reliably in position and is readily applicable and removable according to the requirements of users.

The invention also features a headrest which does not clash or mar the given shape of the backrest of the seat, or offer too much of an obstruction when placing articles on or removing same from the shelf surface of the rear deck.

It will also be noted that the headrest, by reason of its particular construction, shape and form may be made in any suitable width, height, and length. In fact, any appropriate comforting shape may be imparted thereto.

The headrest is further significant in that it may be conveniently stored away in the trunk when not in use, is capable of being employed as a small cushioned seat if one so desires to use it. When in use it affords the user adequate and comforting support for the head and neck, minimizes jolting and otherwise fulfills the purposes for which it is intended.

Briefly summarized the invention is characterized by a substantially rectangular block-like appropriately cushioned headrest having a hard wooden or equivalent center encased in a jacket of cushioning foam or equivalent rubber and having a leather or an equivalent case which is colorful, strong and durable and proper for needed purposes. More importantly, the bottom of the backrest is provided with depending spaced vertically disposed adapter lugs which project below the bottom, are hooked at their outer free ends and are adapted to be retentively inserted into a space provided therefor between the vertical wall of the seat's backrest and the forward vertical wall or panel of the rear deck, this space being provided by the use of one or more spacing sleeves or washers.

Construed from another point of view the invention pertains to the combination of horizontal and vertical components of an automobile rear deck construction, a frame equipped wall or panel of the backrest of the back seat, these parts being spaced apart by a spacing sleeve surrounding a connecting bolt or the like and the space providing a keyway for reception and retention of depending positioning and retaining lugs on the bottom of the headrest.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary view in perspective showing an automobile with the aforementioned rear deck and rear seat structure and illustrating the improved headrest in position thereon;

FIGURE 2 is a view in section and elevation the purpose of which is to show how the attaching and retaining lugs permit the headrest to be readily applied and removed;

FIGURE 3 is a view similar to FIGURE 2 with parts in section and elevation showing the backrest in place;

FIGURE 4 is an exaggerated or enlarged sectional and elevational view illustrating the bolt means and spacing sleeve; and FIGURE 5 is a view in perspective of the backrest with portions broken away and shown in section.

With reference first to FIGURES 2 and 3 the backrest of the rear seat construction (not detailed) is denoted generally by the numeral 6, the same having a vertical back wall or frame 8, the usual suitably shaped upholstering material or cover 10 and packing or cushioning means 12. The aforementioned deck, a common feature of construction in modern automobiles is denoted generally by the numeral 14 and embodies a horizontal shelf 16 and a vertically inclined forward wall or frame 18 which is opposed to the frame 8. The numeral 20 designates a marginal narrow frame member which is secured to the wall or frame 8 and is interposed between the said walls or frames 8 and 18. In order to provide a space between these parts which will accommodate the attaching and retaining means for the novel headrest 22 the arrangement depicted in FIGURE 4 is resorted to. Here it will be noted that the head 24 of a nut-retained bolt is welded or otherwise secured to the wall or frame 8 with the nut-equipped end extending through a hole provided therefor in the frame 8. The elongated washer or spacing sleeve is denoted at 26 and when this is installed, preferably by an automobile mechanic, a space is provided between the frames 8 and 18 to accommodate the attaching means for the headrest. The headrest is preferably of the composite construction illustrated in FIGURE 5.

With reference to FIGURE 5 in particular the core or center part of the headrest is denoted as an entity by the numeral 28 and it is in the form of a hollow or perhaps a rigid wooden or equivalent block which has a wooden or metal plate 30 fastened to the bottom thereof and provided with a slot to permit the projection of the depending adapter and retaining lugs 34. Each lug comprises a rigid metal or an equivalent strap the upper portion 36 of which is superimposed on the wooden block and screwed or otherwise fastened in place at 38, the lower portion projecting through and below the slot 32 and terminating in a curvate bend or hook 40. These members 34 may be referred to as hooked adapters or attaching and retaining lugs. The aforementioned cushioning means comprises foam or equivalent rubber 42 in the form of a jacket which encloses the entire core or block. This cushioning means in turn is encased in a leather or an equivalent suitably shaped and sewn envelope or case 44. Thus a simple block-like or rectangular headrest is had, the same provided with a pair of spaced coplanar attaching and retaining lugs. By having a substantially flat or planar bottom (which is rigid) the bottom portion is supported atop the coacting parts of the backrest and deck respectively, said bottom spanning the slot and the slot serving to receive the depending positioning and retaining adapters or lugs 34. The hook-shaped lower ends 40 of the lugs are hooked and piloted in place (FIG. 2) are hooked under the frame member 20 (FIG. 3) and are thus secured in place.

With the construction illustrated it will be evident that the construction and especially the depending lugs may be suitably adapted to the backrest of practically any passenger-type automobile by slightly changing the form or shape of the lugs. It so happens that the lugs on this particular headrest, the one illustrated, have been formed and shaped for use on a Rambler automobile.

It will further be evident that the headrest is neither suitably designed nor adapted for use on a front seat for which reason the rear or back seat construction is being emphasized. The headrest is not only practical from any point of view but it is almost unbelievably simple and efficient, ready to apply and remove and capable of achieving the end results for which it has been devised.

It is believed that a careful consideration of the specification in conjunction with the views of the drawings will enable the reader to obtain a full and comprehensive understanding of the invention, the features and advantages and mode of use. Therefore, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an automobile body construction embodying a rear deck structure having a horizontal interior shelf and a forward substantially vertical depending wall, a rear seat structure embodying a backrest cooperable with said deck structure and embodying a rearward vertical wall opposed to said first-named wall, spacing sleeves interposed between said walls, bolt means passing through the walls and bores of said sleeves and securing said walls in spaced-apart generally parallel relationship, the upper portions of the horizontal shelf of said deck structure and backrest being in a generally common plane, and a readily applicable and removable headrest disposed in a horizontal plane above the horizontal plane of said shelf and above the plane of the upper marginal portion of said backrest, said headrest comprising a cushioned encased unit having a horizontal bottom provided with a pair of rigid depending spaced coplanar vertical lugs constituting a headrest attaching and holddown members, said lugs fitting retentively but removably into the upper portion only of the space existing between said walls, said headrest having a front vertical surface which is disposed in a vertical plane rearwardly of the plane of the rear wall of said backrest and accordingly assuming an out-of-the-way position so that the occupant of the seat, when sitting erect with his head pitched forward is virtually unaware of the presence of the headrest, said headrest becoming available at the option of the occupant at will when he slumps and slides downwardly and forwardly to bring the front of the headrest within convenient range of use.

2. In a vehicle body construction, the combination of a rear seat structure including a vertical backrest having rigid frame means on a rearward vertical side, an interior rear deck structure complemental to said backrest and embodying a horizontal top shelf normal to said rearward vertical side and vertically depending frame means at its forward side, the respective frame means being opposed and generally parallel to each other, spacing means fixedly interposed between and spacing the respective frame means apart in closely spaced generally parallel but interconnected relationship, and at least one headrest for an occupant of said rear seat having a rearward bottom portion firmly seated atop a proximal horizontal part of said shelf and a forward bottom portion seated atop a horizontal part of the top margin of said backrest, said bottom portion spanning the upper open portion of the underlying space, readily adaptable and applicable anchoring and retaining means depending from said bottom into said space and being wedged and frictionally anchored in between cooperable component parts of the respective frame means but capable of being manually withdrawn from the space when the user desires to bodily shift and adjust the headrest relative to said deck and backrest.

3. The structure according to claim 2 and wherein the anchoring and retaining means comprises a pair of lugs fixed to the bottom of the headrest, said lugs being alike, relatively short, fixed to and carried by the median portion of the bottom of the headrest whereby forward and rearward half-portions of the bottom forwardly and rearwardly of the lugs are adapted to rest simultaneously atop said upper marginal edge of the backrest and the adjacent marginal portion of the deck.

4. The stucture defined in claim 2 and wherein said headrest embodies a rigid core enclosed in cushioning material, said cushioning material being jacketed in an outer protective case and the upper ends of said lugs being fixed to and depending below the bottom of said core.

5. A headrest adapted to be supported atop a horizontal rear deck and an adjacent upper horizontal marginal portion of the backrest of the rear seat structure in an automobile comprising: a flat-faced central core provided with a reinforcing plate on the bottom of said core, said plate being generally flat and of an area in plan that substantial underneath surface portions thereof are accordingly available and adapted to reside firmly and flatwise atop supporting surfaces on the aforementioned rear deck and marginal portion of the backrest, a pair of headrest orienting attaching and holddown lugs, said lugs having flat forward and rearward surfaces and being substantially the same in construction, being vertically elongated and also disposed in spaced apart coplanar relationship, having upper end portions thereof secured flatwise to a rearward flat face of said core and having lower end portions depending below said plate, the extreme lower ends of said lugs being curved forwardly and fashioned into anchoring hooks, cushioning means completely enclosing said core, and a jacket encasing said cushioning means, said lugs being spaced rearwardly of a forward vertical side of said headrest and being spaced forwardly from a rearward side of said headrest.

References Cited in the file of this patent

UNITED STATES PATENTS

| | | |
|---|---|---|
| 1,977,159 | Tursi | Oct. 16, 1934 |
| 2,796,919 | Ginsberg | June 25, 1957 |
| 2,859,797 | Mitchelson | Nov. 11, 1958 |

FOREIGN PATENTS

| | | |
|---|---|---|
| 490,233 | Great Britain | Aug. 11, 1938 |